United States Patent Office 3,669,687
Patented June 13, 1972

3,669,687
PROCESS OF PREPARING FROZEN PUDDING
COMPOSITION
Augustine D. D'Ercole, White Plains, N.Y., assignor to
General Foods Corporation, White Plains, N.Y.
No Drawing. Filed May 5, 1969, Ser. No. 822,022
Int. Cl. A23g 5/00; A23l 1/14
U.S. Cl. 99—139                               5 Claims

ABSTRACT OF THE DISCLOSURE

Preparing a frozen pudding by cooking pudding ingredients containing a modified food starch at a temperature of from about 230° to about 260° F., cooling the cooked mix to about 100° F. and freezing.

---

This invention relates to a novel frozen pudding composition and to a process of preparing the same. More particularly, the invention relates to a frozen pudding having improved freeze-thaw cycling stability and stability upon storage at freezer and refrigerator temperatures for extended periods of time and to a process of preparing the pudding.

Pudding compositions are well-known food products. Generally, the puddings are made in homes, restaurants and the like by blending powdered prepared mixes containing thickening agents, usually starches, with aqueous liquids, typically milk, and then permitting the blend to set to develop the desired textural quality. Such mixes either may be adapted for cooking or they may be of the "instant" type wherein coagulating agents are included usually for the purpose of forming a milk protein gel.

In recent years, pudding compositions requiring little or no preparation by the consumer have become available. These puddings offer considerable convenience in that neither cooking of the pudding ingredients is required nor are even blending and allowing the pudding composition to set necessary. These puddings have been sold and distributed as sterilized canned products or they have been available as refrigerated products. The puddings which are sold and distributed as canned or refrigerated products, however, have certain disadvantages. Thus, with canned puddings, sterilization and canning are required and unused portions of pudding left in the can by the consumer are not usually readily adapted to be stored in a refrigerator for an extended period of time. With refrigerated puddings, their shelf life in refrigerated storage compartments is limited.

Frozen puddings, on the other hand, offer a number of advantageous features including convenience and their ability to be stored at freezer temperatures for long periods of time without spoilage. However, frozen puddings which have been available frequently fail to retain their quality in freezer and refrigerator storage and to exhibit freedom from syneresis or textural change. Although some frozen puddings have been prepared by the use of improved thickeners; such as starches, or gelling agents, such as alginates, textural changes have been noted to be found in such products, particularly on freezer storage and freeze-thaw cycling and also even on refrigerator storage after the puddings have been completely thawed. It would, therefore, be desirable to obtain a frozen pudding which would have long-term stability at freezer temperatures of about 0° F. and stability at refrigerator temperatures of about 40° F. for periods of at least two weeks after the puddings have been thawed from the frozen state. Moreover, it would be advantageous to have a frozen pudding which would be resistant to freeze-thaw cycling especially when it is recognized that many frozen foods cabinets as well as in frozen food distribution equipment may not maintain temperatures of 0° F. Further, temperatures between about 10° F. and about 20° F. are frequently encountered in such cabinets and distribution equipment. When stored at this range of temperatures, although they are below freezing, a frozen pudding may have its textural qualities markedly altered due to rupturing of the starch cells within the pudding and liberation of water from the broken cells. For example, it has been found that when a frozen pudding is exposed to freezer storage at temperatures of between about 10° to about 20° F., ice crystal growth may take place with the result that the starch granules and cells may further rupture and burst thereby causing loss of the continuous and generally homogeneous structure and character of the pudding. Syneresis and other textural changes, such as graininess and decrease of gel strength and viscosity, then become evident.

The present invention either substantially eliminates or minimizes these difficulties encountered with frozen puddings and, at the same time, makes available a novel frozen pudding which is characterized by its excellent stability on freezer storage, during freeze-thaw cycling and also upon refrigerator storage.

Broadly, the invention comprises a frozen pudding containing a modified food starch and a process of preparing the frozen pudding by cooking and cooling the pudding during its preparation under carefully maintained and critical temperature conditions. Typically, the frozen pudding is prepared by cooking the pudding ingredients including modified food starch at temperatures of from about 230° to about 260° F. and cooling the cooked pudding to about 100° F. Following the cooling step, the pudding is packaged in suitable containers and is then further cooled quiescently and frozen.

While modified food starches, such as those described in C.F.R. §121.1031, have been suggested for use in pudding compositions of various kinds and even for frozen puddings such starches, because of their being cross-linked and having substituent groups thereon, generally exhibit a not-too-well defined gelatinization temperature. Thus, it is apparent that the initial gelatinization temperatures may be changed upon modification depending not only on the type or variety of starch but also on the nature of the modification. Moreover, while individual starch granules may gelatinize quite sharply not all the granules in a given quantity of starch gelatinize at the same temperatures but instead gelatinize over a range of, say, 10° to 20° F. This would seem to indicate differences in internal bonding within the starch due to the kind and degree of modification and the starch type and variety. It has now been discovered that by cooking a pudding composition containing a modified starch within the range of about 230° to about 260° F., gelatinization of the starch is able to be controlled in a unique manner which is not completely understood. It appears that cooking at this range of temperatures causes swelling of the granules and cells of the modified food starch so as to obtain the desired gel strength and viscosity. However, rupturing or breaking of the granules and cells is limited and may not occur at all thereby resulting in the frozen pudding of this invention which is characterized by its freezer and refrigerator storage stability and its freeze-thaw cycling stability. On the other hand, conventional puddings are usually prepared by cooking until the granules and cells are ruptured and broken so as to develop the requisite gel strength and viscosity. Yet, such conventional puddings do not exhibit desired freezer and refrigerator stability nor freeze-thaw cycling stability. When such cooking step within the range of about 230° to about 260° F. is followed by cooling at about 100° F., synersis and other textural changes in a resultant frozen pudding maintained at 15° F. were not apparent for periods of eight to twelve weeks and even longer. On the other hand, when cooking temperatures below and above this range are employed even if the cooling temperature is maintained at 100° F., structural breakdown and separation of the pudding stored at 15° F. are noted even after two and three weeks. Further, if cooling temperatures substantially below about 100° F. are employed in cases where the cooking temperature is maintained within optimum range, separation occurs and gel strength and viscosity of the pudding decrease.

The modified food starches which may be employed to prepare the frozen puddings of this invention include those derived from wheat starch, cornstarch, waxy maize starch, potato starch, tapioca starch, and the like, all of which may be modified as described in the above-referred-to C.F.R. §121.1031. The amount of modified food starch in the frozen pudding generally is from about 3 to 10% by weight. An especially suitable modified food starch is an etherified tapioca starch whose modification is set forth in C.F.R. §121.1031(e).

The frozen pudding composition also comprises other conventional pudding ingredients such as water and/or milk and sweetening agents. In preparing the frozen pudding, milk and milk derivative products may be employed. Generally, however, the frozen puddings of this invention are easily prepared using nonfat dry milk solids and water.

Sweetening agents which may be included in the frozen pudding include sucrose, dextrose, lactose, fructose, dextrins and the like.

Optionally, the frozen puddings may include for optimum textural quality, non-dairy fatty emulsions which provide increased smoothness to the puddings. Thus, fatty emulsions comprising fat, protein, emulsifier, stabilizer and water may be incorporated and be blended in ratios of from about 10 to 50% by weight of a pudding base containing the modified starch, water and/or milk and milk derivative products, and sweetening agents. Especially preferred fatty emulsions are those shown and described in U.S. Pat. No. 3,431,117, whose teachings are incorporated herein by reference. Such fatty emulsion to be incorporated in the frozen puddings according to this invention is one which, however, has not been whipped and frozen prior to its blending with the pudding base. Obviously, of course, other edible fatty emulsions usually adapted as cream substitutes may be similarly utilized.

Emulsifiers may be included in the pudding base comprising the modified food starch, water and/or milk or milk derivative product, sweetening agent for the purpose of providing additional textural enhancement. Such emulsifiers may be any one or combinations of a wide variety of edible emulsifiers such as those mentioned in hereinbefore-referred-to U.S. Pat. No. 3,431,117 and also fatty acid esters of lactylic acids and salts thereof, acetylated derivatives of mono- and di-glycerides of fatty acids, phosphated derivatives of fatty acid glycerides, and the like.

Stabilizers, flavoring and coloring agents are ingredients which may also be preferably included in the frozen pudding.

A preferred range of ingredients for the frozen pudding of this invention is as follows:

| | Percent by weight |
|---|---|
| Water | 45–70 |
| Sweetening agent | 12–18 |
| Milk and/or milk derivative | 3–10 |
| Modified food starch | 3–10 |
| Fat or oil | 2–10 |
| Protein | 1–3 |
| Emulsifiers | 0.1–0.5 |
| Stabilizers (gums) | 0.01–1.0 |
| Salt | Less than 1 |
| Flavor and color | .002–.02 |

In order to illustrate the present invention, the following non-restrictive examples are given.

EXAMPLE I

Dry pudding bas ingredients comprising, by weight, 8 parts of sugar, 5 parts of nonfat dry milk solids, 4 parts of modified food starch (etherified tapioca starch) and 0.17 part of emulsifier (sodium stearoyl 2-lactylate) are thoroughly mixed in a ribbon blender. The blend so obtained in added with agitation to 53 parts, by weight, of water in a suitable vessel and 0.001 part of suitable flavor and color is then incorporated into the slurry. A non-dairy fatty emulsion as shown and described in Example I of U.S. Pat. No. 3,431,117, which has been homogenized but not whipped nor frozen, is then added to the slurry in a weight ratio of 1 part of emulsion to 3 parts of slurry. The resultant mixture is then passed into a scraped surface heat exchanger where the temperature of the pudding mix is increased until it reaches a cook temperature of 245° F. The mix is held at this temperature for 60 seconds and it is then circulated through the cooling section of the scraped surface heat exchanger where it is cooled to 100° F. The pudding is then suitably packaged and while in containers is quiescently cooled and frozen at 0° to −10° F. The pudding obtained is then available for distribution through frozen food outlets.

Examination of the pudding obtained indicated no breakdown or structural change in the pudding when it was stored at 0° to −10° F. for periods of more than six months. Moreover, the pudding was found to be resistant to syneresis and separation during repeated freeze-thaw cycling. Further, the pudding when thawed from the frozen state and stored at refrigerator temperatures was observed to be stable for periods in excess of two weeks. Finally, the frozen pudding was noted to be syneresis- and separation-resistant for periods of eight to twelve weeks when stored at 15° F., a temperature frequently found to cause structural breakdown in conventional puddings.

Photomicrographs of the pudding indicated that at the cook temperature employed swelling of the starch granules and cells resulted but rupture and breakage thereof were not evident. Such controlled cooking and cooling conditions as are employed therefore surprisingly appear to bring about stability of the pudding under a wide variety of storage conditions.

EXAMPLES II–XV

The procedure of Example I is repeated in all essential respects except that the cooking temperature is varied over a range of 195° F. to 270° F.

The frozen puddings obtained were then stored at 15° F. and were examined periodically for syneresis, structural breakdown and separation.

The results are tabulated below.

| Example | Cooking temperature, °F. | Cooling temperature, °F. | Separation occurred, time at +15° F., weeks |
|---|---|---|---|
| II | 195 | 100 | 3 |
| III | 215 | 100 | 4 |
| IV | 225 | 100 | 4 |
| V | 235 | 100 | 6 |
| VI | 245 | 100 | 8 |
| VII | 255 | 100 | 9 |
| VIII | 262 | 100 | 9 |
| IX | 270 | 100 | 6 |
| X | 215 | 100 | 3 |
| XI | 225 | 100 | 7 |
| XII | 235 | 100 | 9 |
| XIII | 245 | 100 | 10 |
| XIV | 255 | 100 | 11 |
| XV | 262 | 100 | 12 |

NOTE.—In Examples X–XV, the pudding ingredients were run through the heating side of the heat exchanger twice.

EXAMPLES XVI–XIX

The procedure of Example I is repeated in all essential respects except that the cooling temperature in the scraped surface heat exchanger is varied.

Viscosity measurements are made on the thawed puddings. The results are tabulated below.

| Example | Cooking temperature, °F. | Cooling temperature, °F. | Viscosity (Brookfield #6 spindle) |
|---|---|---|---|
| XVI | 245 | 100 | 38 |
| XVII | 245 | 90 | 33 |
| XVIII | 245 | 70 | 22 |
| XIX | 245 | 50 | 12 |

EXAMPLES XX–XXIV

The procedure of Example I is repeated in all essential respects except that the holding time at the cooking temperature is varied.

The results are tabulated below.

| Example | Cooking temperature, °F. | Time hold | Cooling temperature, °F. | Separation occurred, time at +15° F. |
|---|---|---|---|---|
| XX | 245 | 0 holding time | 100 | None at weeks. |
| XXI | 245 | 30 sec. hold | 100 | Do. |
| XXII | 245 | 60 sec. hold | 100 | Do. |
| XXIII | 245 | 90 sec. hold | 100 | Do. |
| XXIV | 245 | 120 sec. hold | 100 | Do. |

The foregoing results obtained in Examples II–XXIV make it apparent that cooking temperatures of between about 230° and about 260° F. result in a frozen pudding with surprising 15° F. stability. Moreover, the cooling temperature of about 100° F. is noted to be necessary to obtain a pudding with optimum viscosity. It is also seen that the holding time within this specified cooking temperature range may be varied and the resultant 15° F. stability is achieved.

I claim:
1. A process of preparing a frozen pudding composition having improved stability upon freezer and refrigerator storage and during freeze-thaw cycling comprising cooking a mix of pudding ingredients including a modified food starch at a temperature of from about 230° to about 260° F. to swell but not substantially rupture the granules and cells of said modified food starch, cooling the cooked mix to a temperature of about 100° F. and freezing the cooled mix.
2. A process as in claim 1 in which said cooling to about 100° F. is followed by quiescent cooling.
3. A process as in claim 2 in which said modified food starch is an etherified tapioca starch.
4. A process as in claim 3 in which said mix of pudding ingredients further includes water, nonfat dry milk solids, sweetening agent and a non-dairy fatty emulsion.
5. A process as in claim 4 in which said etherified tapioca starch is present in an amount of from about 3 to about 10 percent by weight of said composition.

References Cited
UNITED STATES PATENTS

| 3,369,910 | 2/1968 | Ganz | 99— 139 |
| 2,901,355 | 8/1959 | Bangert | 99—139 |
| 3,422,088 | 1/1969 | Tuschoff et al. | 99—139 |
| 3,300,316 | 1/1967 | Cooper et al. | 99—139 |

RAYMOND N. JONES, Primary Examiner

J. M. HUNTER, Assistant Examiner

U.S. Cl. X.R.

99—136

UNITED STATES PATENT OFFICE
CERTIFICATE OF CORRECTION

Patent No. 3,669,687        Dated June 13, 1972

Inventor(s) Augustine D. D'Ercole

It is certified that error appears in the above-identified patent and that said Letters Patent are hereby corrected as shown below:

Column 4, line 26, "bas" should read -- base --.

Column 5, line 22, "12" should read -- 11 --.

Column 5, line 24, (in the Note after the Table) "hrough" should read -- through --.

Column 6, line 6, (in the last column of the Table) "None at weeks." should read -- None at 12 weeks. --.

Signed and sealed this 9th day of January 1973.

(SEAL)
Attest:

EDWARD M. FLETCHER, JR.
Attesting Officer

ROBERT GOTTSCHALK
Commissioner of Patents